T861039

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1019

764,909

FOAM COMPOSITIONS FOR GASKETS

George B. Feild, New Castle, Del., assignor to Hercules Incorporated, Wilmington, Del., a corporation of Delaware

Continuation-in-part of application Ser. No. 600,034, Dec. 8, 1966. This application Oct. 3, 1968. Published Apr. 22, 1969

Class 260—2.5

No Drawing. 14 Pages Specification

Gaskets made of foamed polypropylene overcome the deficiencies of cork, rubber and polyethylene gaskets and provide outstanding heat and solvent resistance. The small, uniform cells of these foams are almost completely closed with no interconnecting voids. This structure is essential for a gasket to prevent permeation of gases or liquids. Characteristically, the foams are those wherein at least about 80% of the cells are closed and have average diameters less than about 0.030 inch. Also, the foams are characterized by densities of from 0.5 lb./cu. ft. to about 10 lbs./cu. ft.

In preparing the foamed gasketing material, any stereoregular polypropylene and blends thereof with elastomeric hydrocarbon polymers such as polyisobutylene and ethylene-propylene copolymer rubbers can be used. The foams are produced by heating a mixture of the polypropylene, a blowing agent and an azido cross-linking agent to a temperature above the softening point of the composition and sufficient to release the gas from the blowing agent and to effect reaction of the azido compound with the polypropylene. The blowing agents used are well known. The cross-linking agents are poly(sulfonazides) or poly(azidoformates), in amounts from 0.01% to 5% by weight based on polymer.